US009627991B2

(12) United States Patent
Pregitzer et al.

(10) Patent No.: US 9,627,991 B2
(45) Date of Patent: Apr. 18, 2017

(54) RECTIFIER WITH INDICATOR SWITCH (71) Applicant: POWER INTEGRATIONS, INC., San Jose, CA (US)

(72) Inventors: Ricardo L. J. Pregitzer, Campbell, CA (US); Arthur Brian Odell, Morgan Hill, CA (US); Sameer Kelkar, Santa Clara, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 14/771,119

(22) PCT Filed: Mar. 13, 2014

(86) PCT No.: PCT/US2014/025954
§ 371 (c)(1),
(2) Date: Aug. 27, 2015

(87) PCT Pub. No.: WO2014/151538
PCT Pub. Date: Sep. 25, 2014

(65) Prior Publication Data
US 2016/0013733 A1    Jan. 14, 2016

Related U.S. Application Data (60) Provisional application No. 61/799,159, filed on Mar. 15, 2013.

(51) Int. Cl.
*H02M 7/06* (2006.01)
*H02M 7/08* (2006.01)
(Continued)

(52) U.S. Cl.
CPC ............ *H02M 7/08* (2013.01); *H02H 7/1252* (2013.01); *H02M 1/08* (2013.01); *H02M 1/32* (2013.01);
(Continued)

(58) Field of Classification Search
CPC ........ Y02B 70/126; H02M 1/36; H02M 1/32; H02M 7/06; H02M 7/062; H02M 7/066; H02M 3/33592; H02H 7/127
(Continued)

(56) References Cited

U.S. PATENT DOCUMENTS

2007/0014374 A1    1/2007   Hershbarger
2007/0064366 A1    3/2007   Hammond
(Continued)

FOREIGN PATENT DOCUMENTS

JP    10-070879    3/1998
JP    2007-159344    6/2007

OTHER PUBLICATIONS

PCT/US2014/025954—International Search Report and Written Opinion, mailed Jul. 21, 2014 (11 pages).

*Primary Examiner* — Nguyen Tran
(74) *Attorney, Agent, or Firm* — Blakely Sokoloff Taylor & Zafman LLP (57) ABSTRACT

This relates to a rectifier with indicator switch circuit that may be used in a power conversion system. The rectifier with indicator switch circuit may be configured to rectify an ac line voltage and output an indicator signal that is representative of a fault condition in the ac line voltage. The rectifier with indicator switch circuit may include a storage capacitor configured to be charged by the ac line voltage during a first half-cycle of the ac line voltage and a detection capacitor configured to be charged by the storage capacitor during a second half-cycle of the ac line voltage. A switch coupled to the detection capacitor may be configured to generate the indicator signal based on a voltage across the detection capacitor. The indicator signal may be provided to a controller to disable operation of the power conversion system in response to the detection of a fault condition.

26 Claims, 5 Drawing Sheets

(51) Int. Cl.
  *H02H 7/125* (2006.01)
  *H02M 7/04* (2006.01)
  *H02M 1/32* (2007.01)
  *H02M 1/08* (2006.01)
  *H02M 1/44* (2007.01)
  *H02M 1/00* (2006.01)

(52) U.S. Cl.
  CPC ............... *H02M 7/04* (2013.01); *H02M 7/06* (2013.01); *H02M 1/44* (2013.01); *H02M 2001/0003* (2013.01)

(58) Field of Classification Search
  USPC ............ 363/44, 49, 52, 53, 76–77, 125–127
  See application file for complete search history.

(56) References Cited

U.S. PATENT DOCUMENTS

| | | | |
|---|---|---|---|
| 2011/0002148 A1 | 1/2011 | Iturriz et al. | |
| 2011/0122668 A1* | 5/2011 | Lo ........................... | H02J 9/061 363/126 |
| 2012/0008354 A1* | 1/2012 | Tang ....................... | H02M 1/32 363/126 |

* cited by examiner

RECTIFIER WITH INDICATOR SWITCH

CROSS-REFERENCE TO RELATED APPLICATIONS

This application claims priority to U.S. Provisional Patent Application No. 61/799,159, filed Mar. 15, 2013, which is incorporated herein by reference in its entirety.

BACKGROUND

Field

The present disclosure relates generally to a power conversion system and, more specifically, to a circuit for detecting the removal of an alternating current (ac) line voltage from the input of a power conversion system.

Related Art

Many electronic devices, such as cell phones, laptop computers, etc., use direct current (dc) power to operate. Power converters are used to transform ac power from conventional wall outlets to dc power that can be used as a power source by most electronic devices. Generally, these power converters employ a controller that switches a power switch between an ON state and an OFF state to control the amount of power delivered to the output of the power converter.

In some examples, the controller may include a protection circuitry that detects a fault condition of the controller and/or the power converter (e.g., over voltage condition, low voltage condition, or the like), and in response to the fault condition, can cause the ac input signal of the power converter to be removed from the input of the power converter. In this case, the power converter may include a detection circuit to indicate to the controller when the ac input signal is removed. Specifically, when the ac input signal is removed, the detection circuit can provide an indicator signal to the controller to shut down the power converter.

Typically, detection circuits include resistive elements coupled to the input of the power converter. While the circuits can be effective at detecting the removal of the ac input signal, they can also consume large amounts of power as resistive elements continuously dissipate power. Specifically, the amount of power consumed by the detection circuit may be a large portion of the overall power budget of the power converter during no-load conditions.

Additionally, some power converters may be used in a single-phase three-wire power conversion system. That is, the power conversion system can include a third terminal in addition to a line terminal and a neutral terminal that are generally included in two-wire systems. This third terminal can act as a protective earth, conducting current only during certain fault conditions (e.g., when there is a short circuit current in the system). Having a detection circuit that can operate both in a two-wire and three-wire power system to detect the removal of the ac input signal may be desirable.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment," "an embodiment," "one example," or "an example" means that a particular feature, structure, or characteristic described in connection with the embodiment or example is included in at least one embodiment of the present invention. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or subcombinations in one or more embodiments or examples. Particular features, structures, or characteristics may be included in an integrated circuit, an electronic circuit, a combinational logic circuit, or other suitable components that provide the described functionality. In addition, it should be appreciated that the figures provided herewith are for explanation purposes to persons ordinarily skilled in the art and that the drawings are not necessarily drawn to scale.

This relates to a rectifier with indicator switch circuit that may be used in a power conversion system. The rectifier with indicator switch circuit may be configured to rectify an ac line voltage and output an indicator signal that is representative of a fault condition in the ac line voltage. The rectifier with indicator switch circuit may include a storage capacitor configured to be charged by the ac line voltage during a first half-cycle of the ac line voltage and a detection capacitor configured to be charged by the storage capacitor during a second half-cycle of the ac line voltage. The rectifier with indicator switch circuit may further include a semiconductor switch (e.g., a transistor) coupled to the detection capacitor that is configured to switch between an ON state and an OFF state to generate the indicator signal based on a voltage across the detection capacitor. In one example, the switch may be configured to switch to the ON state in response to the voltage across the detection capacitor decreasing below a detection threshold voltage that is representative of the fault condition in the ac line voltage. The indicator signal may be provided to a controller to disable operation of the power conversion system in response to the detection of the fault condition.

Figure 1:
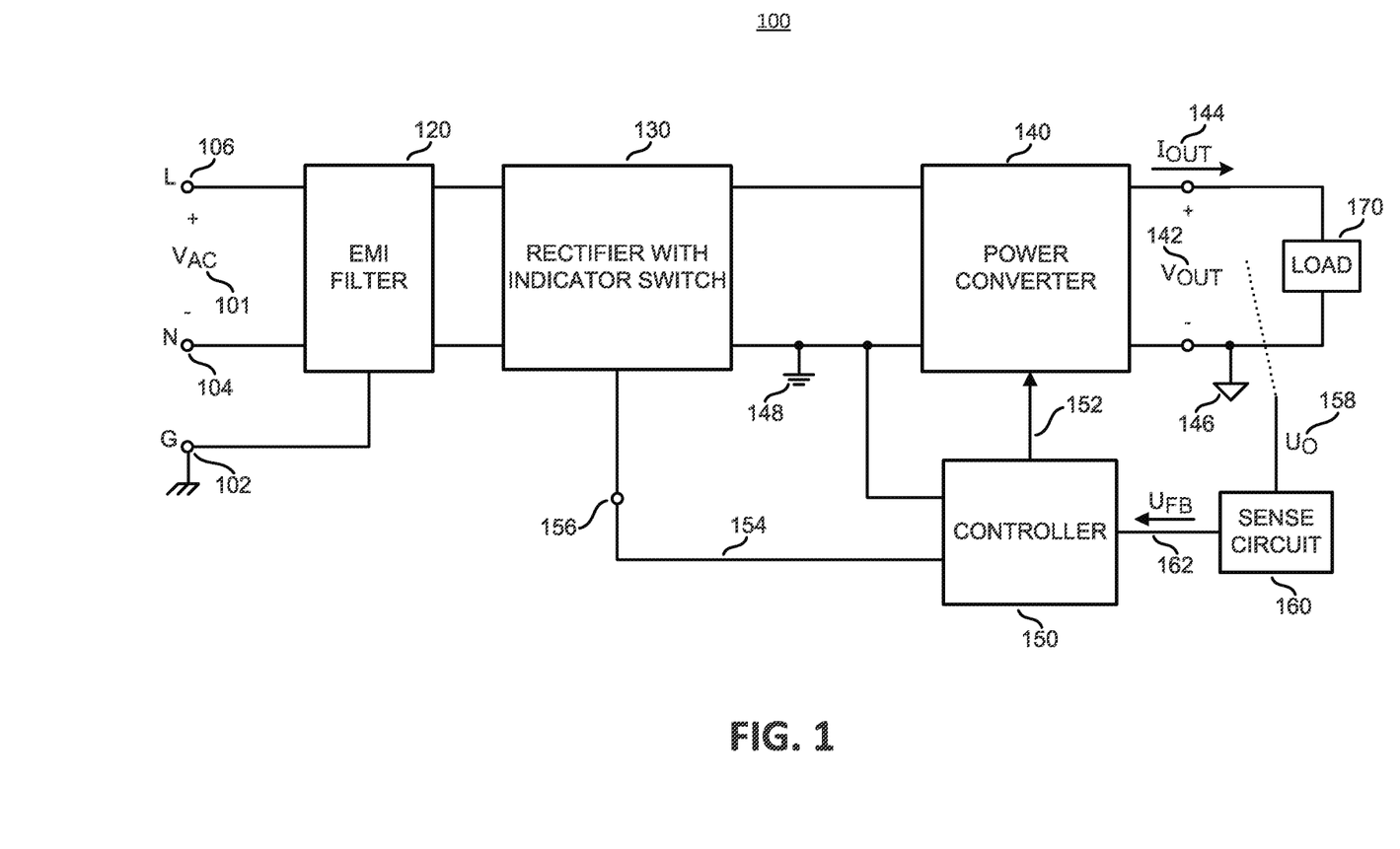
FIG. 1 is a schematic block diagram illustrating an example power conversion system including a rectifier with indicator switch.

FIG. 1 is a schematic block diagram illustrating an example power conversion system 100 including rectifier with indicator switch 130. Power conversion system 100 may generally include EMI filter 120, rectifier with indicator switch 130, power converter 140, controller 150, sense circuit 160, and load 170. Power conversion system 100 may be configured to deliver an output voltage $V_{OUT}$ 142 and an output current $I_{OUT}$ 144 to load 170 from an unregulated ac line voltage $V_{AC}$ 101 (also referred to as a line signal or an ac input voltage) received between line input terminal L 106 and a neutral input terminal N 104. In some examples, power conversion system 100 may be a single-phase two-wire system. In some examples, ac line voltage $V_{AC}$ 101 may include a periodic ac line voltage.

EMI filter 120 of power conversion system 100 may be coupled to receive ac line voltage $V_{AC}$ 101 and to output a filtered version of ac line voltage $V_{AC}$ 101. EMI filter 120 may include one or more filters made up of inductors and/or capacitors. In some examples, one of the internal nodes of EMI filter 120 may be coupled to a ground terminal G 102, which may serve as a protective earth for power conversion system 100. Thus, power conversion system 100 may be a single-phase three-wire system.

Rectifier with indicator switch 130 may be coupled to receive the filtered version of ac line voltage $V_{AC}$ 101 from EMI filter 120 and to output a rectified voltage corresponding to a rectified version of ac line voltage $V_{AC}$ 101. The rectified voltage may be output across the output terminals of rectifier with indicator switch 130. One output terminal of rectifier with indicator switch 130 may be coupled to reference ground 148, which may represent the lowest voltage or potential against which all voltages of rectifier with indicator switch 130, controller 150, and all voltages on the input side of power converter 140 may be measured or referenced. Rectifier with indicator switch 130 may further include detection terminal 156 coupled to output an indicator signal 154. Rectifier with indicator switch 130 may be configured to adjust a value of indicator signal 154 to be representative of a fault condition, such as, for example, ac line voltage $V_{AC}$ 101 being removed from the input of power conversion system 100 or ac line voltage $V_{AC}$ 101 being below an input threshold for a threshold length of time, or the like, as determined based on the filtered version of ac line voltage $V_{AC}$ 101 from EMI filter 120 (and thus, based on ac line voltage $V_{AC}$ 101).

Power converter 140 may be coupled to receive the rectified voltage output by rectifier with indicator switch 130. Power converter 140 may provide an output voltage $V_{OUT}$ 142 and an output current $I_{OUT}$ 144 to load 170. Power converter 140 may include one of many known power converter topologies, such as flyback, buck, boost, and forward topologies. In the illustrated example, one of the output terminals of power converter 140 may be coupled to output ground 146. In this example, output ground 146 may represent the lowest voltage or potential against which all voltages on the output side of power converter 140 may be measured or referenced. In one example, output ground 146 may be different from reference ground 148. In another example, output ground 146 may be the same as reference ground 148. Additionally, power converter 140 may include a power switch (not shown) coupled to an energy transfer element (not shown) to control the transfer of energy from the input to the output of power converter 140. In one example, power converter 140 may include a coupled inductor as an energy transfer element and a metal oxide semiconductor field effect transistor (MOSFET) as a power switch. The power switch may be switched between an ON state (e.g., a state in which current is allowed to conduct) and an OFF state (e.g., a state in which current conduction is prevented) to control the amount of energy transferred from the input to the output of power converter 140 through the coupled inductor. Power converter 140 may further include capacitors (not shown), such as input and output smoothing capacitors, clamp circuitry (not shown), and other known circuit elements.

Controller 150 may be coupled to control power converter 140 using a control signal 152 to regulate an output quantity $U_O$ 158 (e.g., output voltage $V_O$ 142 and/or output current $I_O$ 144) at a desired level. In some examples, control signal 152 may be coupled to control the switching of the power switch of power converter 140 between an ON state and an OFF state to regulate output quantity $U_O$ 158 produced by power converter 140 across load 170. Controller 150 may further be coupled to reference ground 148 and to receive indicator signal 154 from rectifier with indicator switch 130 and feedback signal $U_{FB}$ 162 from sense circuit 160. Feedback signal $U_{FB}$ 162 may be generated by sense circuit 160 based on output quantity $U_O$ 158. Controller 150 may be configured to output control signal 152 based on feedback signal $U_{FB}$ 162 and indicator signal 154. For example, controller 150 may adjust control signal 152 to cause power converter 140 to transfer more or less energy from the input to the output of power converter 140 based on a value of output quantity $U_O$ 158. Additionally, controller 150 may be configured to adjust control signal 152 to disable power converter 140 and prevent the regulation of output quantity 158 for a certain period of time in response to indicator signal 154. For example, as discussed above, rectifier with indicator switch 130 may reduce a value of indicator signal 154 in response to a fault condition, such as, for example, ac line voltage $V_{AC}$ 101 being removed from the input of power conversion system 100 or ac line voltage $V_{AC}$ 101 being below an input threshold for a threshold length of time. In some examples, terminal 156 may be coupled to provide indicator signal 154 at a bypass terminal of controller 150. In one example, controller 150 may be powered from the bypass terminal. Specifically, the bypass terminal may be coupled to a capacitor that is periodically charged from ac line voltage $V_{AC}$ 101. When the capacitor is charged to a certain level, the energy stored on the capacitor can provide enough power to operate controller 150. In response to a fault condition occurring, rectifier with indicator switch 130 may reduce the value of indicator signal 154 (e.g., to ground), thereby discharging the capacitor coupled to the bypass terminal and hence, disabling controller 150. In other examples, controller 150 may be configured to adjust control signal 152 to cause power converter 140 to shut down (e.g., enter a reset state) or to prevent the switching of the power switch of power converter 140 in response to indicator signal 154 having the reduced value. Rectifier with indicator switch 130 may maintain indicator signal 154 at a low value (causing power converter 140 to remain disabled) until ac line voltage $V_{AC}$ 101 is again applied to the input of power conversion system 100 or the fault condition is otherwise eliminated.

Figure 2:
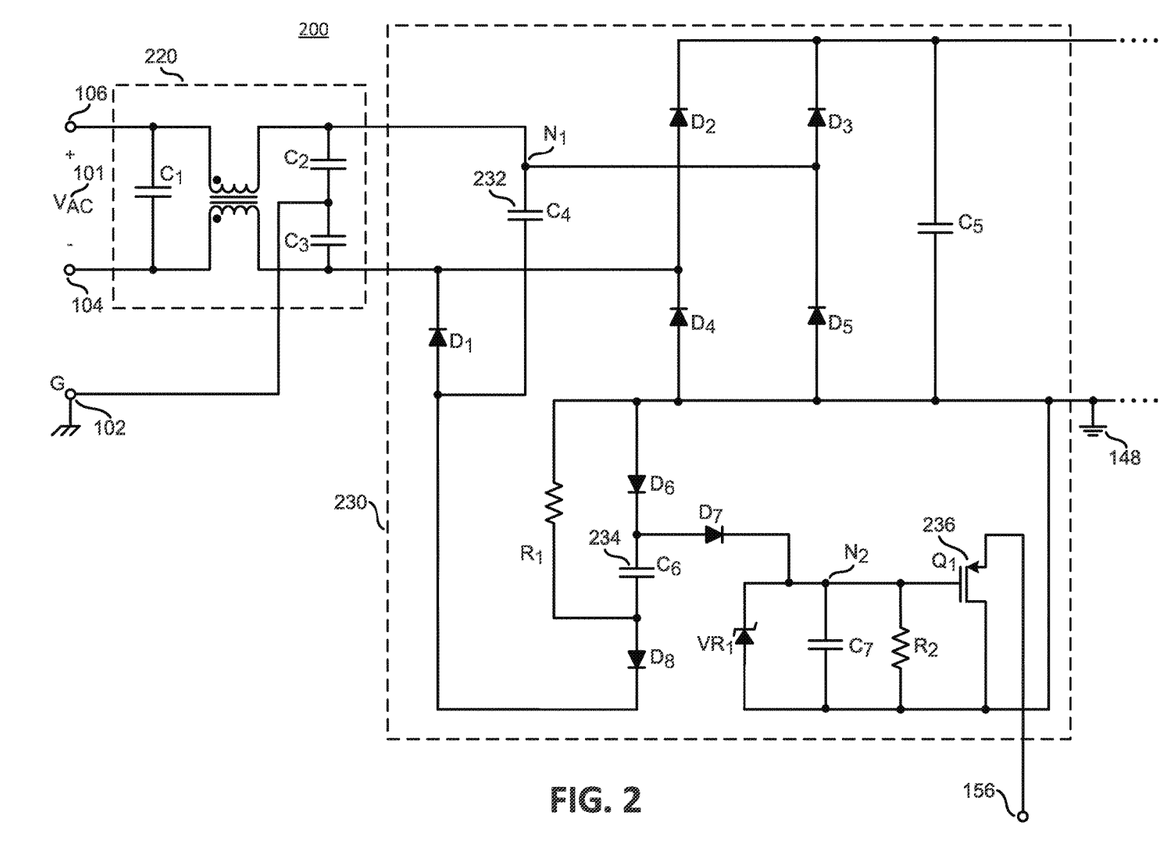
FIG. 2 is a schematic circuit diagram illustrating an example rectifier with indicator switch and an example EMI filter that may be used in the power conversion system of FIG. 1.

FIG. 2 is a schematic circuit diagram 200 illustrating an example rectifier with indicator switch 230 that may be used to implement rectifier with indicator switch 130 and an example EMI filter 220 that may be used to implement EMI filter 120.

EMI filter 220 may be coupled to receive ac line voltage $V_{AC}$ 101 and output a filtered version of ac line voltage $V_{AC}$ 101 to rectifier with indicator switch 230. In this manner, EMI filter 220 may reduce the noise in ac line voltage $V_{AC}$ 101 and thus, smooth the signal that is provided to the input of rectifier with indicator switch 230. EMI filter 220 may include a capacitor $C_1$ coupled to a coupled inductor (also referred to as a transformer). The coupled inductor may further be coupled to capacitors $C_2$ and $C_3$, which may be coupled in series. In some examples, the node between capacitors $C_2$ and $C_3$ may be coupled to ground terminal G 102, which may serve as a protective earth.

Rectifier with indicator switch 230 may be coupled to receive a filtered version of ac line voltage $V_{AC}$ 101 output by EMI filter 220 at its input terminals, output a rectified voltage corresponding to a rectified version of ac line voltage $V_{AC}$ 101, and adjust an indicator signal output at detection terminal 156. In particular, when ac line voltage $V_{AC}$ 101 is above an input threshold (e.g., a value that is representative of a normal operating condition), the indicator signal at detection terminal 156 may be at a high value and remain unchanged. However, when ac line voltage $V_{AC}$ 101 is removed or decreases below the input threshold (e.g., a value that is representative of a fault condition) for greater than the threshold length of time, the indicator signal may be adjusted by being pulled down to reference ground 148. In some examples, the indicator signal may be the same as indicator signal 154 shown in FIG. 1 and may be provided directly to controller 150. Alternatively, in other examples, the indicator signal may be inverted before being provided to controller 150. In yet other examples, the indicator signal may be provided to controller 150 via a circuit element that provides isolation (e.g., an optocoupler or the like).

Rectifier with indicator switch 230 may include a high impedance circuit coupled to the input terminals of rectifier with indicator switch 230. The high impedance circuit may include storage capacitor $C_4$ 232 coupled to diode $D_1$. Both storage capacitor $C_4$ 232 and diode $D_1$ may be coupled between the input terminals of rectifier with indicator switch 230. In operation, storage capacitor $C_4$ 232 may store energy received from ac line voltage $V_{AC}$ 101 by charging during at least a portion of the time that ac line voltage $V_{AC}$ 101 is positive (e.g., during a portion of a positive half-cycle of ac line voltage $V_{AC}$ 101). Storage capacitor $C_4$ 232 may be discharged during at least a portion of the time that ac line voltage $V_{AC}$ 101 is negative (e.g., during a portion of a negative half-cycle of ac line voltage $V_{AC}$ 101).

Rectifier with indicator switch 230 may further include a full-wave bridge rectifier coupled between the high impedance circuit and the output terminals of rectifier with indicator switch 230. The full-wave bridge rectifier may include diodes $D_2$, $D_3$, $D_4$, $D_5$, and capacitor $C_5$. Diodes $D_2$, $D_3$, $D_4$, and $D_5$ may generate the rectified voltage and capacitor $C_5$ may smooth the rectified voltage to generate a rectified voltage that is constant or near constant at a non-zero value, such as the peak level of ac line voltage $V_{AC}$ 101.

Rectifier with indicator switch 230 may further include detection capacitor $C_7$ for determining when ac line voltage $V_{AC}$ 101 is removed or is below the input threshold for the threshold length of time. Detection capacitor $C_7$ may periodically receive energy and hence, charge during at least a portion of the time that ac line voltage $V_{AC}$ 101 is negative (e.g., during a portion of a negative half-cycle of ac line voltage $V_{AC}$ 101). The voltage at one end (node $N_2$) of detection capacitor $C_7$ may be monitored to determine whether the voltage drops below a detection threshold, which may be indicative of ac line voltage $V_{AC}$ 101 being removed or decreasing below the input threshold for greater than the threshold length of time. Rectifier with indicator switch 230 may also include a resistor $R_2$ coupled across detection capacitor $C_7$ at node $N_2$. As such, the threshold length of time may be determined at least in part by the RC time constant associated with node $N_2$ (e.g., values of resistor $R_2$ and detection capacitor $C_7$). In some examples, the capacitance of storage capacitor $C_4$ 232 may be less than the capacitance of detection capacitor $C_7$.

Rectifier with indicator switch 230 may further include an auxiliary circuit coupled between reference ground 148 and one end of storage capacitor $C_4$ 232 (the node between the anode of diode $D_1$ and storage capacitor $C_4$ 232). The auxiliary circuit may include auxiliary capacitor $C_6$ 234, diode $D_6$, diode $D_8$, and resistor $R_1$.

Rectifier with indicator switch 230 may further include diode $D_7$ coupled between auxiliary capacitor $C_6$ 234 and detection capacitor $C_7$. In this configuration, during a positive half-cycle of ac line voltage $V_{AC}$ 101, diode $D_8$ of the auxiliary circuit may be reverse biased, preventing current conduction (e.g., energy transfer) between storage capacitor $C_4$ 232 and the auxiliary circuit. Diode $D_7$, however, may be forward biased and conducting current, thereby allowing auxiliary capacitor $C_6$ 234 and detection capacitor $C_7$ to discharge through resistors $R_1$ and $R_2$. As a result, the voltage at node $N_2$ may decrease during this time. While auxiliary capacitor $C_6$ 234 and capacitor $C_7$ are discharging, storage capacitor $C_4$ 232 may be charged by ac line voltage $V_{AC}$ 101. In other words, the voltage at one end of storage capacitor $C_4$ 232 (node $N_1$) with respect to reference ground 148 may increase. During a negative half-cycle of ac line voltage $V_{AC}$ 101, diode $D_8$ may be forward biased, allowing current to conduct (e.g., allowing energy transfer) between storage capacitor $C_4$ 232 and the auxiliary circuit. Diode $D_7$ may also be forward biased and conducting current. As a result, the energy stored across storage capacitor $C_4$ 232 during the preceding positive half-cycle of ac line voltage $V_{AC}$ 101 may be transferred to auxiliary capacitor $C_6$ 234 and detection capacitor $C_7$. In other words, storage capacitor $C_4$ 232 may discharge (causing the voltage at node $N_1$ with respect to reference ground 148 to decrease) through auxiliary capacitor $C_6$ 234, detection capacitor $C_7$, and resistor $R_2$ during a negative half-cycle of ac line voltage $V_{AC}$ 101. Detection capacitor $C_7$ may be charged with the current provided by storage capacitor $C_4$ 232. Thus, the voltage at node $N_2$ may increase during at least a portion of a negative half-cycle of ac line voltage $V_{AC}$ 101. Because detection capacitor $C_7$ is charged from the high impedance circuit, the power consumption of rectifier with indicator switch 230 may be reduced.

Rectifier with indicator switch 230 may further include a P-channel MOSFET $Q_1$ 236 as a semiconductor switch that is coupled to detection capacitor $C_7$ (at node $N_2$). Other known semiconductor devices, such as a bipolar junction transistor (BJT), insulated-gate bipolar transistor (IGBT), or the like with appropriate modification(s) to rectifier with indicator switch 230 may also be used as the semiconductor switch. The state of transistor $Q_1$ 236 (e.g., ON/OFF) may be determined at least in part by the voltage at node $N_2$. The amount of current conducted by transistor $Q_1$ 236 (and thus, the value of the indicator signal at detection terminal 156) may depend on the state of transistor $Q_1$ 236.

In operation, when ac line voltage $V_{AC}$ 101 is applied to the input of rectifier with indicator switch 230, the voltage at node $N_2$ may be sufficiently large (e.g., greater than the detection threshold) such that the source to gate voltage of transistor $Q_1$ 236 may be less than the threshold voltage of transistor $Q_1$ 236. Under these conditions, transistor $Q_1$ 236 may be in the OFF state and may not conduct current, thereby keeping the indicator signal unchanged. When ac line voltage $V_{AC}$ 101 is removed or is below the input threshold for at least the threshold length of time, the voltage at node $N_2$ may drop below the detection threshold such that the source to gate voltage of transistor $Q_1$ 236 becomes greater than the threshold voltage of transistor $Q_1$ 236. Under these conditions, transistor $Q_1$ 236 may be in the ON state and may conduct current, thereby driving the indicator signal down to reference ground 148. In other words, transistor $Q_1$ 236 may not conduct current during normal operation and may only conduct current for a brief period of time during a fault condition. This may reduce the energy dissipated by transistor $Q_1$ 236 and thereby lower the power consumption of rectifier with indicator switch 230.

Rectifier with indicator switch 230 may further include a Zener component $VR_1$ having one or more Zener diodes coupled across detection capacitor $C_7$ between node $N_2$ and reference ground 148. Zener component $VR_1$ may clamp the voltage at node $N_2$ at a certain level (e.g., 15V) with respect to reference ground 148 when detection capacitor $C_7$ is being charged by the current from storage capacitor $C_4$ 232 during at least a portion of a negative half-cycle of ac line voltage $V_{AC}$ 101. Clamping of the voltage at node $N_2$ may prevent damaging of transistor $Q_1$ 236 that may otherwise occur if the voltage difference between the gate and the drain of transistor $Q_1$ 236 is allowed to exceed the gate to drain breakdown voltage.

The rectifier with indicator switch illustrated in FIG. 2 can operate both in a two-wire and a three-wire power conversion system. In a two-wire power conversion system, regardless of how an ac line voltage is removed from the input of the power conversion system (e.g., regardless of whether only one of line input terminal L 106 and neutral input terminal N 104 is uncoupled or both input terminals are uncoupled from the ac line voltage), storage capacitor $C_4$ 232 does not receive energy from the ac line voltage during the positive half-cycle of the ac line voltage. Therefore, detection capacitor $C_7$ does not receive energy from storage capacitor $C_4$ 232 during the negative half-cycle of the ac line voltage. Accordingly, the voltage at node $N_2$ decreases below the detection threshold, causing transistor $Q_1$ 236 to switch to the ON state and thereby reduce the indicator signal to indicate to controller 150 that the ac line voltage is removed.

In a three-wire power conversion system, such as power conversion system 100, when an ac line voltage is removed from the input of the power conversion system such that either one of line input terminal L 106 or neutral input terminal N 104 is uncoupled from the ac line voltage, storage capacitor $C_4$ 232 may still receive energy during the positive half-cycle of the ac line voltage. As an example, the ac line voltage may be removed in such a way that neutral input terminal N 104 is uncoupled from the ac line voltage. In this case, storage capacitor $C_4$ 232 still receives energy during the positive half-cycle of the ac line voltage while detection capacitor $C_7$ is discharging, because there is a closed path for current from line input terminal L 106 to ground terminal G 102. However, during the negative half-cycle of the ac line voltage, diode $D_8$ remains reverse biased and detection capacitor $C_7$ continues to discharge. As such, the voltage at node $N_2$ decreases below the detection threshold, causing transistor $Q_1$ 236 to switch to the ON state and thereby, reducing the indicator signal to indicate to controller 150 that the ac line voltage is removed. It is in this manner that rectifier with indicator switch 230 can detect the removal of the ac line voltage both in a two-wire and a three-wire power conversion system.

According to the description above, many different combinations of component values may be used to provide the desired performance depending on the application. In one example, the components may be chosen to have approximately the following values: $C_4$=220 pF, $C_5$=4.4 µF, $C_6$=47 nF, $C_7$=47 nF, $R_1$=3 MΩ, $R_2$=6 MΩ, the breakdown voltage of $D_1$ and $D_8$=50 V, the breakdown voltage of $D_6$ and $D_7$=100 V, the reverse breakdown voltage of $VR_1$=15 V, and the threshold voltage of $Q_1$=2 V. In one example, when the components are chosen as above, rectifier with indicator switch 230 can detect the presence of an ac line voltage that is 70 VAC or greater at the input of power conversion system 100.

Figure 3:
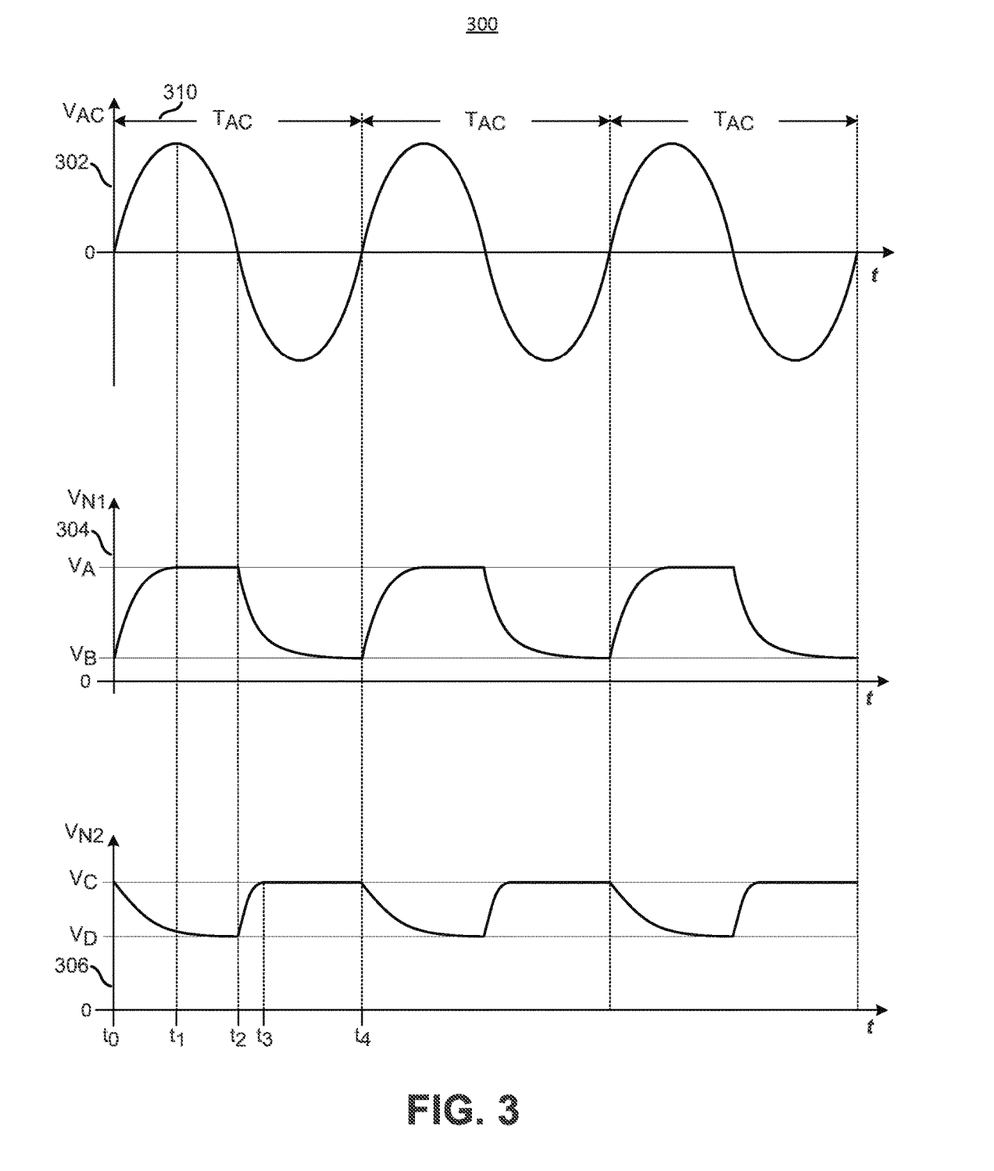
FIG. 3 shows example waveforms that correspond to a signal at the input of the power conversion system of FIG. 1 and various signals of the rectifier with indicator switch of FIG. 2 during normal operation.

FIG. 3 shows example waveforms 300 that correspond to a signal at the input of power conversion system 100 and various signals of rectifier with indicator switch 230 during normal operation. Waveform 302 may be representative of an example line voltage $V_{AC}$ (e.g., ac line voltage $V_{AC}$ 101) applied to the input of power conversion system 100, waveform 304 may be representative of an example signal $V_{N1}$ at node $N_1$ (e.g., the voltage at node $N_1$) of rectifier with indicator switch 230, and waveform 306 may be representative of an example signal $V_{N2}$ at node N2 (e.g., the voltage at node N2) of rectifier with indicator switch 230. Waveform 302 may be a periodic sinusoidal signal with a period $T_{AC}$ 310, which may also be referred to as a line cycle. Waveform 304 and 306 may also be periodic signals with the same period as that of waveform 302.

As shown in FIG. 3, waveform 304 may vary between signal levels $V_B$ and $V_A$ during the line cycle of line voltage $V_{AC}$. The increase of waveform 304 from signal level $V_B$ to signal level $V_A$ (e.g., beginning at time point $t_0$) may correspond an increase in voltage $V_{N1}$ at node $N_1$ caused by storage capacitor $C_4$ 232 being charged by ac line voltage $V_{AC}$ 101 during at least a portion of a positive half of the line cycle (e.g., when ac line voltage $V_{AC}$ 101 is positive), such as between time points $t_0$ and $t_1$. Signal level $V_A$ may correspond to the peak level of waveform 302 (hence, peak level of ac line voltage $V_{AC}$ 101). Waveform 304 may remain constant at signal level $V_A$ between time points $t_1$ and $t_2$ due to diode $D_1$ being reversed biased as a result of the ac line voltage $V_{AC}$ 101 beginning to decrease from the peak level, thereby preventing storage capacitor $C_4$ 232 from discharging. During the length of time between time points $t_0$ and $t_2$ (the positive half of the line cycle), diode $D_8$ may be reverse biased and may prevent current conduction between storage capacitor $C_4$ 232 and the auxiliary circuit. Diode $D_7$, however, may be forward biased and conducting current, thereby allowing auxiliary capacitor $C_6$ 234 and detection capacitor $C_7$ to discharge through resistors $R_1$ and $R_2$. As a result, the voltage $V_{N2}$ at node $N_2$ may decrease as illustrated by waveform 306 decreasing from signal level $V_C$ to signal level $V_D$ between time points $t_0$ and $t_2$.

During a negative half of the line cycle (e.g., when ac line voltage $V_{AC}$ 101 is negative), such as between time points $t_2$ and $t_4$, diode $D_8$ may be forward biased, allowing current to conduct between storage capacitor $C_4$ 232 and the auxiliary circuit. Diode $D_7$ may also be forward biased and conducting current. As a result, the energy stored across storage capacitor $C_4$ 232 during the preceding positive half-cycle of ac line voltage $V_{AC}$ 101 may be discharged through auxiliary capacitor $C_6$ 234, detection capacitor $C_7$, and resistor $R_2$, as illustrated by waveform 304 decreasing from signal level $V_A$ to signal level $V_B$ between time points $t_2$ and $t_4$. While the energy stored in storage capacitor $C_4$ 232 is being transferred to auxiliary capacitor $C_6$ and detection capacitor $C_7$ during the negative half of the line cycle, the voltage $V_{N2}$ at node $N_2$ may increase as shown by waveform 306 increasing from signal level $V_D$ to signal level $V_C$ between time $t_2$ and $t_3$. As previously mentioned, Zener component $VR_1$ may clamp the voltage at a certain level with respect to reference ground 148. In one example, signal level $V_C$ may represent the clamping level. As such, the voltage $V_{N2}$ at node $N_2$ may remain unchanged after reaching the clamping signal level during the negative half of the line cycle. That is, waveform 306 may increase from signal level $V_D$ to signal level $V_C$ until time point $t_3$ and may remain constant between time points $t_3$ and $t_4$.

Rectifier with indicator switch 230 may be configured such that the voltage $V_{N2}$ at node $N_2$ is always greater than the detection threshold (e.g., signal level $V_D$ is greater than the detection threshold) during normal operation. In other words, the difference between the voltage $V_{N2}$ at node $N_2$ and the voltage at the source terminal of transistor $Q_1$ 236 may always be less than the threshold voltage of transistor $Q_1$ 236 (and thus, transistor $Q_1$ 236 may be in the OFF state) during normal operation. The signal level $V_D$ may be determined at least in part by the RC time constant associated with node $N_2$ (e.g., values of resistor $R_2$ and detection capacitor $C_7$).

Figure 4:
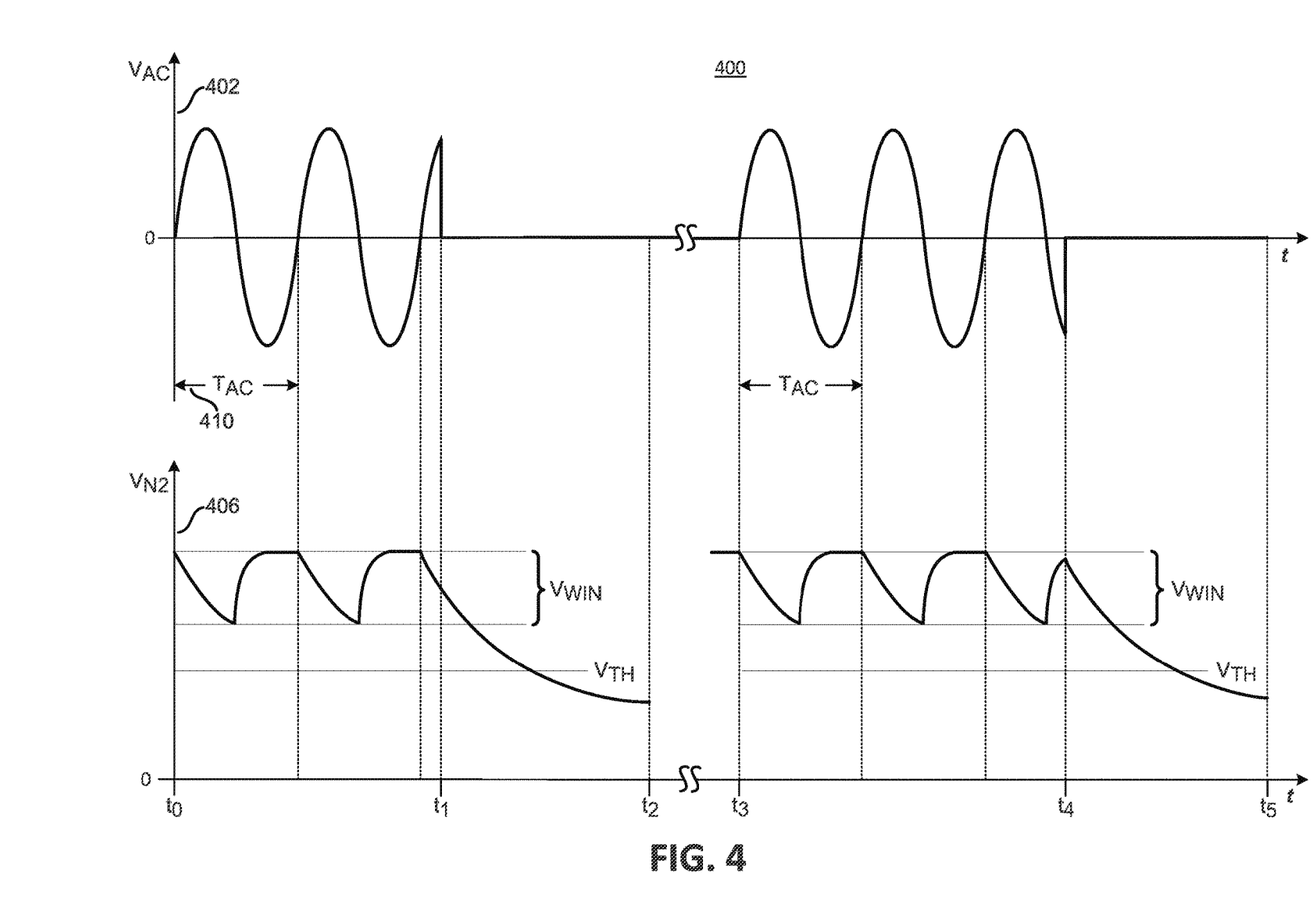
FIG. 4 shows example waveforms illustrating the operation of the rectifier with indicator switch of FIG. 2 during a fault condition.

FIG. 4 shows example waveforms 400 illustrating the operation of rectifier with indicator switch 230 during a fault condition. Waveform 402 may be representative of an example line voltage $V_{AC}$ (e.g., $V_{AC}$ 101) that is a periodic sinusoidal signal with period $T_{AC}$ 410 and that includes periods of time when its voltage drops to zero volts. The fault condition may correspond to a removal of ac line voltage $V_{AC}$ 101 from the input of power conversion system 100 or ac line voltage $V_{AC}$ 101 being below the input threshold for longer than the threshold length of time. Waveform 406 may be representative of an example signal $V_{N2}$ at node N2 when waveform 402 is applied to the input of rectifier with indicator switch 230.

The time between time points $t_0$ and $t_2$ may represent the operation of rectifier with indicator switch 230 when a fault condition occurs when waveform 402 is positive (e.g., at time point $t_1$). As shown, waveform 406 may vary within a voltage window $V_{WIN}$ between time points $t_0$ and $t_1$. At time point $t_1$, waveform 402 drops to zero volts and remains at that level until time point $t_2$. This may correspond to ac line voltage $V_{AC}$ 101 being removed from the input of rectifier with indicator switch 230 between time points $t_1$ and $t_2$. This may cause the voltage $V_{N2}$ at node N2 to continue to decrease below the detection threshold as illustrated by waveform 406 decreasing below detection threshold level $V_{TH}$.

The time between time points $t_3$ and $t_5$ may represent the operation of rectifier with indicator switch 230 when a fault condition occurs when waveform 402 is negative (e.g., at time point $t_4$). As shown, waveform 406 may vary within voltage window $V_{WIN}$ between time points $t_3$ and $t_4$. At time point $t_4$, waveform 402 drops to zero volts and remains at that level until time point $t_5$. This may correspond to ac line voltage $V_{AC}$ 101 being removed from the input of rectifier with indicator switch 230 between time points $t_4$ and $t_5$. This may cause the voltage $V_{N2}$ at node $N_2$ to continue to decrease below the detection threshold as illustrated by waveform 406 decreasing below detection threshold level $V_{TH}$.

In both examples shown in FIG. 4, when the voltage $V_{N2}$ at node $N_2$ is above the detection threshold $V_{TH}$, transistor $Q_1$ 236 may remain in the OFF state. As a result, the indicator signal at detection terminal 156 may be held constant at the high value. When the voltage $V_{N2}$ at node $N_2$ decreases below the detection threshold $V_{TH}$, transistor $Q_1$ 236 may begin conducting current, thereby driving the indicator signal down to reference ground 148. In this way, rectifier with indicator switch 230 may indicate to controller 150 that a fault condition has occurred in ac line voltage $V_{AC}$ 101 (e.g., ac line voltage $V_{AC}$ 101 has been removed or has decreased below an input threshold for greater than a threshold length of time).

Figure 5:
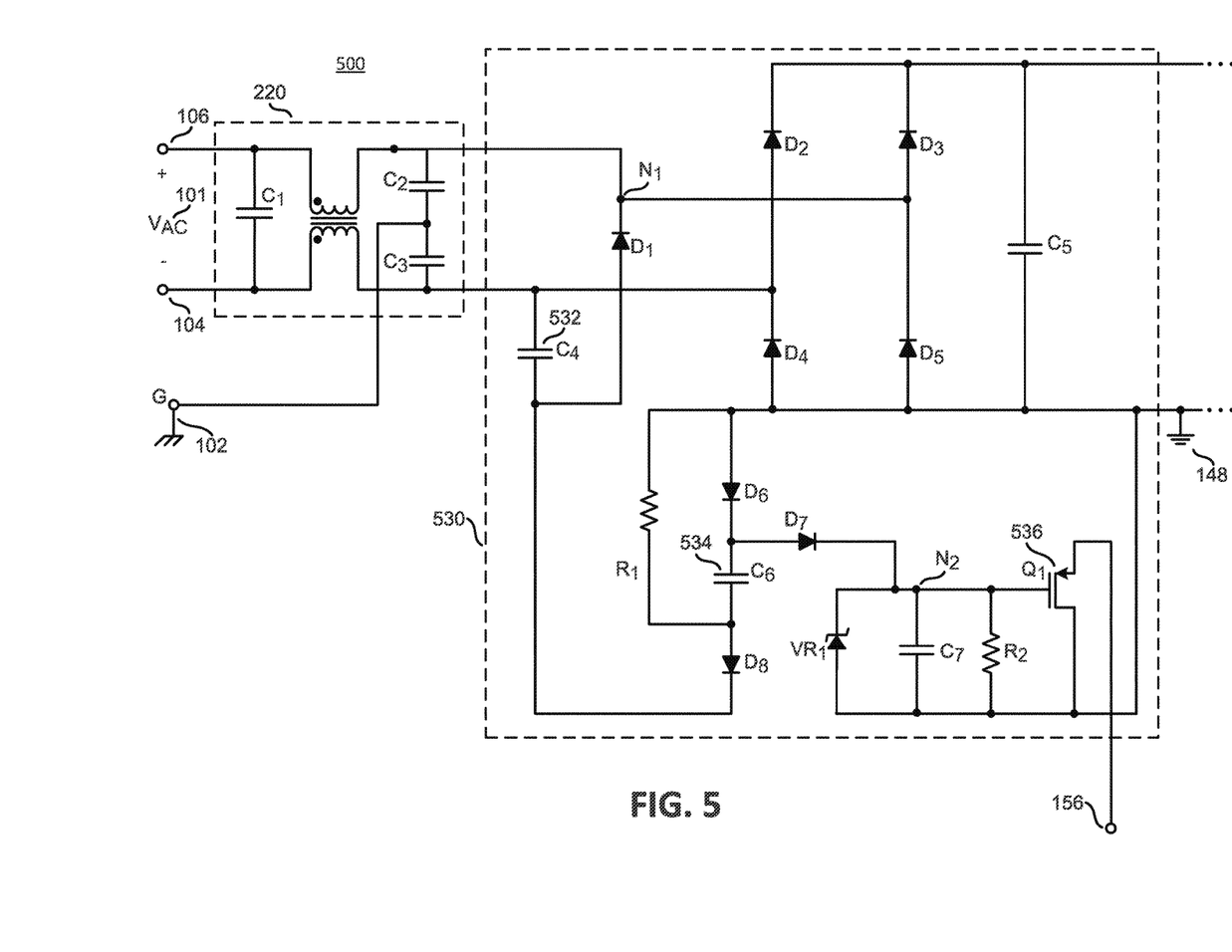
FIG. 5 is a schematic circuit diagram illustrating another example rectifier with indicator switch that may be used in the power conversion system of FIG. 1.

FIG. 5 is a schematic circuit diagram 500 illustrating another example rectifier with indicator switch 530 that may be used to implement rectifier with indicator switch 130. Components of rectifier with indicator switch 530 may be coupled and may function in a manner similar to those of rectifier with indicator switch 230 in FIG. 2. However, the position of storage capacitor $C_4$ 532 and the position of diode $D_1$ in the high impedance circuit may be switched such that storage capacitor $C_4$ 532 may be charged by ac line voltage $V_{AC}$ 101 during at least a portion of the time that ac line voltage $V_{AC}$ 101 is negative and may be discharged through auxiliary capacitor $C_6$ 534, detection capacitor $C_7$, and resistor $R_2$ during at least a portion of the time that ac line voltage $V_{AC}$ 101 is positive. As a result, auxiliary capacitor $C_6$ 534 and detection capacitor $C_7$ may be charged during at least a portion of a positive half-cycle of ac line voltage $V_{AC}$ 101 and may be discharged through resistors $R_1$ and $R_2$ during a negative half-cycle of ac line voltage $V_{AC}$ 101. Transistor $Q_1$ 536 may be coupled to detection capacitor $C_7$ (at node $N_2$) and may function in a manner similar to that described above with respect to transistor $Q_1$ 236.

The above description of illustrated examples of the present invention, including what is described in the Abstract, are not intended to be exhaustive or to be a limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A rectifier circuit comprising:
    an input to be coupled to receive an alternating current (ac) input voltage;
    a full-wave bridge rectifier coupled to the input and configured to rectify the ac input voltage to output a rectified ac input voltage;
    a high-impedance circuit comprising an impedance element coupled to the input, wherein the impedance element is configured to be charged by the ac input voltage during at least a portion of a first half-cycle of the ac input voltage;
    a detection capacitor coupled to be charged by the impedance element during at least a portion of a second half-cycle of the ac input voltage;
    a transistor coupled to the detection capacitor and configured to switch between an ON state and an OFF state to generate an indicator signal representative of a fault condition in the ac input voltage based on a voltage across the detection capacitor; and an auxiliary circuit coupled between the high-impedance circuit and the detection capacitor, wherein the auxiliary circuit is configured to prevent current conduction from the impedance element to the detection capacitor during the at least a portion of a first half-cycle of the ac input voltage, and wherein the auxiliary circuit is configured to allow current to conduct from the impedance element to the detection capacitor during the at least a portion of a second half-cycle of the ac input voltage.

2. The rectifier circuit of claim 1, wherein the transistor is configured to switch to the ON state in response to the voltage across the detection capacitor decreasing below a detection threshold voltage.

3. The rectifier circuit of claim 2, wherein the detection capacitor is configured to maintain the voltage across the detection capacitor at or above the detection threshold voltage while the ac input voltage has a voltage that is greater than or equal to an input threshold voltage and while the ac input voltage is coupled to the input.

4. The rectifier circuit of claim 2, wherein the detection capacitor is configured to allow the voltage across the detection capacitor to decrease below the detection threshold voltage in response to the ac input voltage being removed from the input or in response to the ac input voltage having a voltage that is less than an input threshold voltage.

5. The rectifier circuit of claim 1, wherein the transistor is coupled to a terminal of a controller of a power converter, and wherein the indicator signal comprises a voltage at the terminal of the controller.

6. The rectifier circuit of claim 5, wherein the terminal of the controller comprises a bypass terminal, and wherein the transistor is configured to decrease the voltage at the bypass terminal by switching to the ON state in response to the voltage across the detection capacitor decreasing below a detection threshold voltage.

7. The rectifier circuit of claim 1, wherein the impedance element comprises a capacitor, and wherein a capacitance of the capacitor is less than a capacitance of the detection capacitor.

8. The rectifier circuit of claim 1, wherein the first half-cycle of the ac input voltage comprises a positive half-cycle of the ac input voltage, and wherein the second half-cycle of the ac input voltage comprises a negative half-cycle of the ac input voltage.

9. The rectifier circuit of claim 1, wherein the first half-cycle of the ac input voltage comprises a negative half-cycle of the ac input voltage, and wherein the second half-cycle of the ac input voltage comprises a positive half-cycle of the ac input voltage.

10. A power conversion system comprising:
an input to be coupled to receive an alternating current (ac) input voltage;
a rectifier circuit coupled to the input, the rectifier circuit comprising:
a full-wave bridge rectifier coupled to the input and configured to rectify the ac input voltage to output a rectified ac input voltage;
a high-impedance circuit comprising an impedance element coupled to the input, wherein the impedance element is configured to be charged by the ac input voltage during at least a portion of a first half-cycle of the ac input voltage;
a detection capacitor coupled to be charged by the impedance element during at least a portion of a second half-cycle of the ac input voltage;
a transistor coupled to the detection capacitor and configured to switch between an ON state and an OFF state to generate an indicator signal representative of a fault condition in the ac input voltage based on a voltage across the detection capacitor; and
an auxiliary circuit coupled between the high-impedance circuit and the detection capacitor, wherein the auxiliary circuit is configured to prevent current conduction from the impedance element to the detection capacitor during the at least a portion of a first half-cycle of the ac input voltage, and wherein the auxiliary circuit is configured to allow current to conduct from the impedance element to the detection capacitor during the at least a portion of a second half-cycle of the ac input voltage;
a power converter coupled to receive the rectified ac input voltage from the full-wave bridge rectifier; and
a controller coupled to receive the indicator signal from the transistor, wherein the controller is configured to control the power converter based at least in part on the indicator signal.

11. The power conversion system of claim 10, wherein the transistor is configured to switch to the ON state in response to the voltage across the detection capacitor decreasing below a detection threshold voltage.

12. The power conversion system of claim 11, wherein the detection capacitor is configured to maintain the voltage across the detection capacitor at or above the detection threshold voltage while the ac input voltage has a voltage that is greater than or equal to an input threshold voltage and while the ac input voltage is coupled to the input.

13. The power conversion system of claim 11, wherein the detection capacitor is configured to allow the voltage across the detection capacitor to decrease below the detection threshold voltage in response to the ac input voltage being removed from the input or in response to the ac input voltage having a voltage that is less than an input threshold voltage.

14. The power conversion system of claim 10, wherein the transistor is coupled to a bypass terminal of the controller, and wherein the transistor is configured to decrease a voltage at the bypass terminal by switching to the ON state in response to the voltage across the detection capacitor decreasing below a detection threshold voltage.

15. The power conversion system of claim 10, wherein the impedance element comprises a capacitor, and wherein a capacitance of the capacitor is less than a capacitance of the detection capacitor.

16. The power conversion system of claim 10, wherein the first half-cycle of the ac input voltage comprises a positive half-cycle of the ac input voltage, and wherein the second half-cycle of the ac input voltage comprises a negative half-cycle of the ac input voltage.

17. The power conversion system of claim 10, wherein the first half-cycle of the ac input voltage comprises a negative half-cycle of the ac input voltage, and wherein the second half-cycle of the ac input voltage comprises a positive half-cycle of the ac input voltage.

18. The power conversion system of claim 10, further comprising a filter coupled between the input and the rectifier circuit.

19. A circuit for use in an alternating current (ac) to direct current (dc) power conversion system, the circuit comprising:

an impedance element coupled across an input of the circuit to store energy from an ac voltage across the input during at least a portion of a first half cycle of the ac voltage;

a full-wave bridge rectifier coupled to the input and configured to rectify the ac voltage to output a rectified ac voltage;

a detection circuitry coupled between the impedance element and an output terminal of the circuit, the detection circuitry comprising:

a detection capacitor coupled to be charged, during at least a portion of a second half cycle of the ac voltage, by the energy stored on the impedance element; and a semiconductor switch coupled between the detection capacitor and the output terminal and configured to switch between an ON state and an OFF state in response to a voltage across the detection capacitor, wherein switching of the semiconductor switch adjusts a signal level at the output terminal; and an auxiliary circuit coupled between the impedance element and the detection capacitor, wherein the auxiliary circuit is configured to prevent energy from being transferred from the impedance element to the detection capacitor during at least a portion of the first half-cycle of the ac voltage, and wherein the auxiliary circuit is configured to allow energy to be transferred from the impedance element to the detection capacitor during at least a portion of the second half-cycle of the ac voltage.

20. The circuit of claim 19, wherein the semiconductor switch is configured to switch to the ON state in response to the voltage across the detection capacitor decreasing below a detection threshold voltage.

21. The circuit of claim 20, wherein the detection capacitor is configured to maintain the voltage across the detection capacitor at or above the detection threshold voltage while the ac voltage has a voltage that is greater than or equal to an input threshold voltage and while the ac voltage is coupled to the input.

22. The circuit of claim 20, wherein the detection capacitor is configured to allow the voltage across the detection capacitor to decrease below the detection threshold voltage in response to the ac voltage being removed from the input or in response to the ac voltage having a voltage that is less than an input threshold voltage for a threshold length of time.

23. The circuit of claim 19, wherein the semiconductor switch is configured to decrease the signal level by switching to the ON state in response to the voltage across the detection capacitor decreasing below a detection threshold voltage.

24. The circuit of claim 19, wherein the impedance element comprises a capacitor, and wherein a capacitance of the capacitor is less than a capacitance of the detection capacitor.

25. The circuit of claim 19, wherein the first half-cycle of the ac voltage comprises a positive half-cycle of the ac voltage, and wherein the second half-cycle of the ac voltage comprises a negative half-cycle of the ac voltage.

26. The circuit of claim 19, wherein the semiconductor switch is a MOSFET.

* * * * *